(12) United States Patent
Robert et al.

(10) Patent No.: US 12,214,369 B2
(45) Date of Patent: Feb. 4, 2025

(54) BASE FOR A POWDER COATING BOOTH

(71) Applicant: EXEL INDUSTRIES, Epernay (FR)

(72) Inventors: Stéphane Robert, Paris (FR); Pascal Vignon, Paris (FR)

(73) Assignee: EXEL INDUSTRIES, Epernay (FR)

( * ) Notice: Subject to any disclaimer, the term of this patent is extended or adjusted under 35 U.S.C. 154(b) by 813 days.

(21) Appl. No.: 17/194,296

(22) Filed: Mar. 7, 2021

(65) Prior Publication Data

US 2021/0283643 A1 Sep. 16, 2021

(30) Foreign Application Priority Data

Mar. 11, 2020 (FR) ...................................... 2002427

(51) Int. Cl.
| | |
|---|---|
| *B05B 16/40* | (2018.01) |
| *B05B 7/14* | (2006.01) |
| *B05B 14/48* | (2018.01) |
| *B05B 16/60* | (2018.01) |

(52) U.S. Cl.
CPC .............. *B05B 16/40* (2018.02); *B05B 14/48* (2018.02); *B05B 16/60* (2018.02); *B05B 7/1445* (2013.01); *B05B 7/1468* (2013.01)

(58) Field of Classification Search
CPC ....... B05B 16/40; B05B 16/60; B05B 7/1468; B05B 7/1445; B05B 14/48
USPC ........................................................ 239/273
See application file for complete search history.

(56) References Cited

U.S. PATENT DOCUMENTS

| | | | | |
|---|---|---|---|---|
| 3,905,785 A | * | 9/1975 | Fabre ...................... | B05B 14/48 55/303 |
| 4,091,764 A | * | 5/1978 | Brennenstuhl ........ | B05C 19/002 118/621 |
| 4,409,009 A | * | 10/1983 | Lissy ................. | B01D 46/2407 118/DIG. 7 |

(Continued)

FOREIGN PATENT DOCUMENTS

| | | |
|---|---|---|
| CN | 103008160 A | 4/2013 |
| DE | 7014433 U | 9/1970 |

(Continued)

OTHER PUBLICATIONS

Machine Translation of CN-103008160-A Description, Dec. 2023, Espacenet, pp. 1-2 (Year: 2023).*

(Continued)

*Primary Examiner* — Qingzhang Zhou
*Assistant Examiner* — Kevin Edward Schwartz
(74) *Attorney, Agent, or Firm* — Soquel Group LLC

(57) ABSTRACT

A base for a powder coating booth, including a base structure, through which the booth is intended to rest on a floor, the base structure being configured to support a powder coating compartment of the booth. The base also includes a floor, which is supported by the base structure and which is configured to delimit the bottom of the powder coating compartment. To reduce the accumulation of residual powder, the floor includes at least one oblique panel, which is inclined with respect to the horizontal and which is configured to delimit the bottom of the powder coating compartment of the booth, whereas the at least one oblique panel is porous so as to be permeable to the air and impermeable to the residual powder resulting from powder coating an article within the powder coating compartment.

12 Claims, 3 Drawing Sheets

(56) References Cited

U.S. PATENT DOCUMENTS

| | | | | |
|---|---|---|---|---|
| 4,454,832 | A * | 6/1984 | Gernez | B05B 16/90 |
| | | | | 118/634 |
| 4,471,715 | A * | 9/1984 | Gubler | B05B 14/43 |
| | | | | 118/DIG. 7 |
| 5,256,201 | A * | 10/1993 | Gelain | B05B 14/435 |
| | | | | 118/308 |
| 5,421,885 | A * | 6/1995 | Trevisan | B05B 12/122 |
| | | | | 118/316 |
| 5,690,995 | A * | 11/1997 | Fischli | B05B 14/48 |
| | | | | 427/478 |
| 5,851,248 | A * | 12/1998 | Wilson | B05B 14/48 |
| | | | | 55/357 |
| 6,582,517 | B2 * | 6/2003 | Volonte | B05B 16/40 |
| | | | | 118/308 |
| 6,669,780 | B2 * | 12/2003 | Browning | B05B 14/45 |
| | | | | 118/308 |
| 6,878,205 | B2 * | 4/2005 | Browning | B05B 14/48 |
| | | | | 118/309 |
| 2005/0011438 | A1 * | 1/2005 | Ainsworth | B05B 14/48 |
| | | | | 118/326 |
| 2011/0250364 | A1 * | 10/2011 | Yamaguchi | B05B 14/48 |
| | | | | 118/696 |

FOREIGN PATENT DOCUMENTS

| | | |
|---|---|---|
| DE | 3406464 A1 | 9/1985 |
| DE | 19500872 A1 | 7/1996 |

OTHER PUBLICATIONS

INPI Rapport de Recherche Preliminaire for Patent Application No. FR 2002427, Nov. 5, 2020, 2 pp.

* cited by examiner

BASE FOR A POWDER COATING BOOTH

CROSS-REFERENCE TO RELATED APPLICATION

This application claims priority of French Patent Application No. 20 02427, filed on Mar. 11, 2020.

FIELD OF THE INVENTION

The present invention relates to a base for a powder coating booth, as well as a powder coating booth comprising such a base.

BACKGROUND OF THE INVENTION

A powder coating booth, for applying a coating such as paint to an article, is known by the electrostatic powder coating of the article within a powder coating compartment of the booth. The application of powder to the article is done using a powder projector that projects the powder onto the article in the powder coating compartment. The powder is attracted to the article by electrostatic effect, the powder and the article being brought to specific electrostatic potentials. Once the powder coating has been done, the article is transported to an oven to cause a cross-linking of a thermosetting material that forms the powder and thus set the coating on the article.

A significant portion of the powder emitted by the projector during the powder coating of the article does not reach the article and tends to settle on the walls and floor of the powder coating compartment booth. The booth is equipped with a residual powder suction system, placing the interior of the powder coating compartment in a vacuum to recover most of this powder for recycling and mixing it with new powder for coating subsequent articles. Part of this vacuum system is usually formed within a base of the booth, under the floor, to recover the powder accumulated on the floor. However, despite this suction system, residual powder usually remains attached to the walls and floor, so it is necessary to clean the powder coating compartment regularly, especially if you wish to change the type of powder, for example for a color change, which takes time. The booth floor is usually flat and horizontal, to facilitate the cleaning of the residual powder by an operator. In addition, the use of a powerful vacuum system consumes a substantial amount of energy, which has an impact on the environment and on the cost price of the powder coating operation.

SUMMARY OF THE DESCRIPTION

The invention aims to overcome the disadvantages of the prior art by providing a new base for a powder coating booth, thanks to which the accumulation of residual powder is reduced.

The invention relates to a base for a powder coating booth, the base including a base structure, through which the booth is intended to rest on a floor, the base structure being configured to support a powder coating compartment of the booth, and a floor, which is supported by the base structure and which is configured to delineate the bottom of the powder coating compartment. According to the invention, the floor includes at least one oblique panel, which is inclined with respect to the horizontal and which is configured to delimit the bottom of the powder coating compartment of the booth. At least the oblique panel is porous so as to be permeable to air and impermeable to residual powder resulting from a powder coating of an article within the powder coating compartment.

Preferably, the base includes means for introducing pressurized air under the at least one oblique panel, so that the pressurized air thus introduced passes through the at least one oblique panel into the interior of the powder coating compartment, to detach the residual powder present on the at least one oblique panel. As a means of introduction, the base includes one or more compressed air inlet opening(s), for example, connected to a compressed air source, for introducing the pressurized air into a housing of the base, the housing being formed under the at least one oblique panel and delimited by the at least one oblique panel. Preferably, the housing is delimited longitudinally by two transverse contour walls belonging to the base structure, transversely by two longitudinal bulkheads belonging to the base structure, at the bottom by a bottom wall belonging to the base structure, and at the top by the at least one oblique panel.

Preferably, the base includes a vibrator, which is configured to vibrate the at least one oblique panel with respect to the base structure. If the vibrator is provided, the vibrator is preferably received inside the housing. If the beam is provided, the beam is advantageously arranged inside the housing.

The vibrating of the at least one oblique panel combined with the fact that the at least one oblique panel is inclined with respect to the horizontal when the base structure rests on the floor, enables the residual powder received on the oblique panel to flow along the at least one oblique panel. The at least one oblique panel is preferably oriented so that the residual powder flows towards a gutter formed by the base structure of the base, from which the residual powder may be recovered by suction. This reduces the suction power required, since the at least one oblique panel enables the residual powder to be concentrated in a predetermined area of the base, such as the gutter. Also, the accumulation of residual powder on the floor itself is reduced, since the at least one oblique panel automatically conveys the residual powder due to its inclination and the vibrations produced by the vibrator. The need for an operator to clean the residual powder is also reduced.

In a variant, the base is without a vibrator, or the vibrator is optional.

Other advantageous and optional features of the invention are described below.

Preferably, the at least one oblique panel has an inclination of between 5 and 45 degrees with respect to the horizontal, when the base rests on the ground via the base structure, preferably between 10 and 20 degrees.

Preferably, two oblique panels are provided, these oblique panels each having an upper edge and being joined to their respective upper edge.

Preferably, the base structure includes two opposite transverse contour walls, the at least one oblique panel connecting the two transverse contour walls to each other, and the base includes a beam supporting the at least one oblique panel and the vibrator, extending below the at least one oblique panel, and including two opposite beam ends, through which the beam is attached to the two transverse contour walls respectively.

Preferably, each beam end is attached to one of the two transverse contour walls via at least one anti-vibration pad belonging to the base.

Preferably, the at least one oblique panel has a lower edge which is permanently attached to a longitudinal bulkhead belonging to the base structure, the base structure includes at least one longitudinal gutter, which is delimited by the longitudinal bulkhead, extends under the floor, is open towards the floor, and has a discharge end through which the at least one gutter opens outside the base, the floor includes at least one retractable flap which is movable between an extended position, in which the at least one retractable flap covers the at least one longitudinal gutter, and an open position, in which the at least one retractable flap uncovers the at least one longitudinal gutter as compared to the extended position.

Preferably, the at least one retractable flap is movable between the extended position and the open position by being rotatable relative to the base structure.

Preferably, the base includes means for introducing pressurized air under the at least one oblique panel, the base being configured so that the pressurized air thus introduced passes through the porous oblique panel into the interior of the powder coating compartment, to detach residual powder present on the at least one oblique panel.

Preferably, the floor includes a taut fabric that forms the at least one oblique panel.

The invention also relates to a powder coating booth including a base as defined above, and the powder coating compartment, which is supported by the base structure whose bottom is delimited by the floor.

Independently of the above-mentioned invention, a particular embodiment may be considered, which aims at remedying the disadvantages of the prior art by providing a new base for a powder coating booth, thanks to which the accumulation of residual powder is reduced.

This particular embodiment is to provide a base for a powder coating booth, the base including a base structure, through which the booth is intended to rest on a floor, the base structure being configured to support a powder coating compartment of the booth, and a floor, which is supported by the base structure and which is configured to delimit the bottom of the powder coating compartment. In this case, the floor includes at least one oblique panel, which is inclined with respect to the horizontal and which is configured to delimit the bottom of the powder coating compartment of the booth. In this case, the base includes a vibrator, which is configured to vibrate the at least one oblique panel with respect to the base structure.

The vibrating of the at least one oblique panel, combined with the fact that the at least one oblique panel is inclined with respect to the horizontal when the base structure rests on the floor, enables the residual powder received on the oblique panel to run down the at least one oblique panel. The at least one oblique panel is preferably inclined so that the residual powder flows towards a gutter formed by the base structure of the base, from which the residual powder may be recovered by suction. This reduces the suction power required, since the at least one oblique panel enables the residual powder to be concentrated in a predetermined area of the base, such as the gutter. Also, the accumulation of residual powder on the floor itself is reduced, since the at least one oblique panel automatically conveys the residual powder due to its inclination and the vibrations produced by the vibrator. The need for an operator to clean the residual powder is also reduced.

Further advantageous and optional features of this particular embodiment are described in the following.

Preferably, the at least one oblique panel has an inclination of between 5 and 45 degrees to the horizontal, when the base rests on the floor via the base structure, preferably between 10 and 20 degrees.

Preferably, two oblique panels are provided, these oblique panels each having an upper edge and being joined to their respective upper edge.

Preferably, the base structure includes two opposite transverse contour walls, the at least one oblique panel connecting the two transverse contour walls to each other, and the base includes a beam supporting the at least one oblique panel and the vibrator, extending below the at least one oblique panel, and including two opposite beam ends, through which the beam is attached to the two transverse contour walls respectively.

Preferably, each beam end is attached to one of the two transverse contour walls via at least one anti-vibration pad belonging to the base.

Preferably, the at least one oblique panel has a lower edge that is permanently attached to a longitudinal bulkhead belonging to the base structure, the base structure includes at least one longitudinal gutter, which is delimited by the longitudinal bulkhead, extends under the floor, is open towards the floor, and has a discharge end through which the at least one gutter opens outside of the base, the floor includes at least one retractable flap which is movable between an extended position, in which the at least one retractable flap covers the at least one longitudinal gutter, and an open position, in which the at least one retractable flap uncovers the at least one longitudinal gutter as compared to the extended position.

Preferably, the at least one retractable flap is movable between the extended position and the open position by being rotatable relative to the base structure.

Preferably, the at least one oblique panel is impermeable to the air.

Preferably, the at least one oblique panel is porous so as to be permeable to the air and impermeable to the residual powder from powder coating an article within the powder coating compartment.

Preferably, the base includes means for introducing pressurized air under the at least one oblique panel, the base being configured such that the pressurized air so introduced passes through the porous oblique panel into the interior of the powder coating compartment, to loosen residual powder present on the at least one oblique panel.

Preferably, the floor includes a taut fabric that forms the at least one oblique panel.

This particular embodiment also relates to a powder coating booth including a base as defined above, and the powder coating compartment, which is supported by the base structure and whose bottom is delimited by the floor.

In this particular embodiment, any feature described for the invention may be also provided.

BRIEF DESCRIPTION OF THE DRAWINGS

The invention and the advantages thereof will appear more clearly in the light of the following description of examples according to the invention, given for a non-limitative purpose, and made with reference to the appended drawings in which.

DETAILED DESCRIPTION

Figure 1:
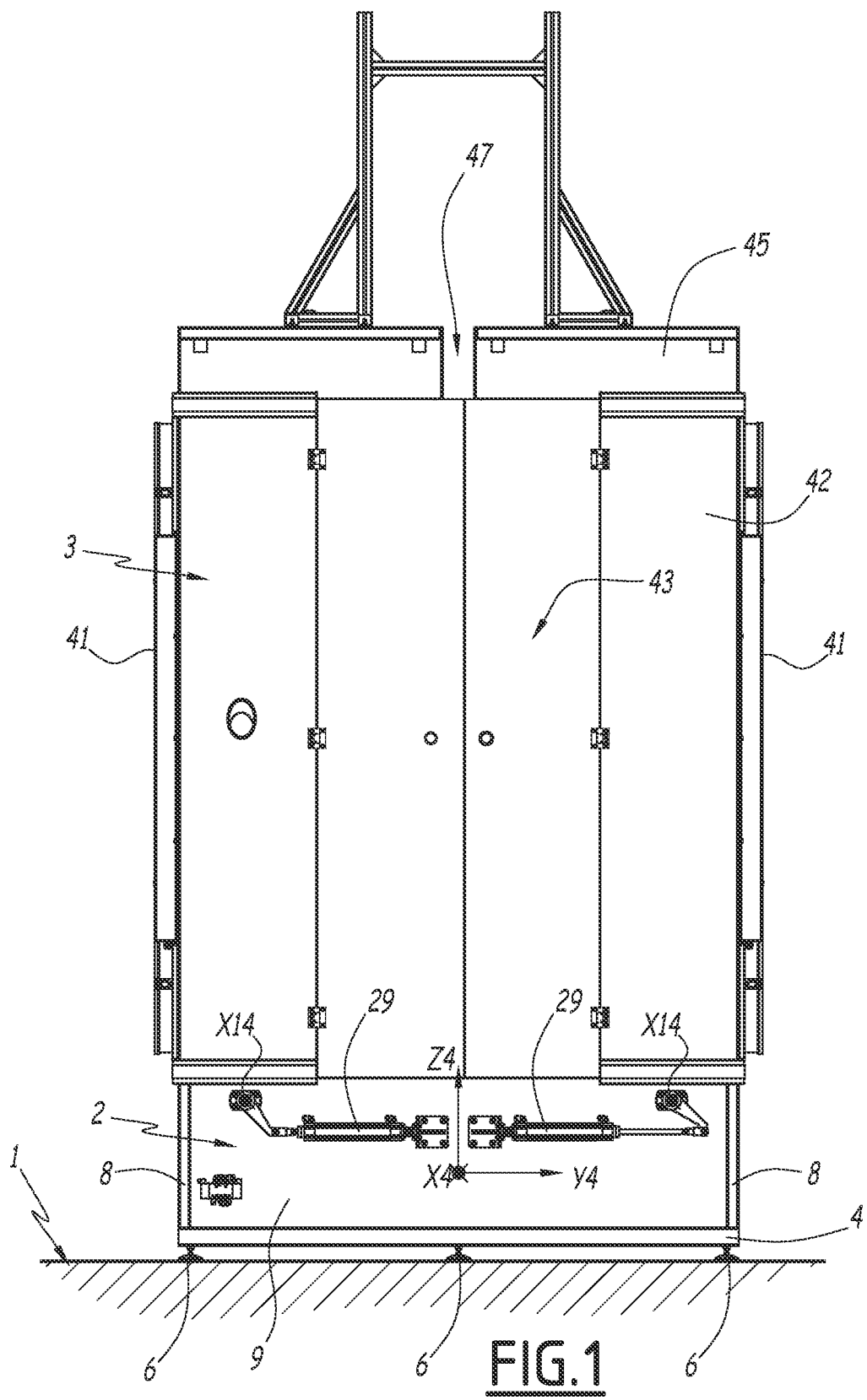
FIG. 1 is a front view of a powder coating booth including a base according to an embodiment of the invention.
Figure 2:
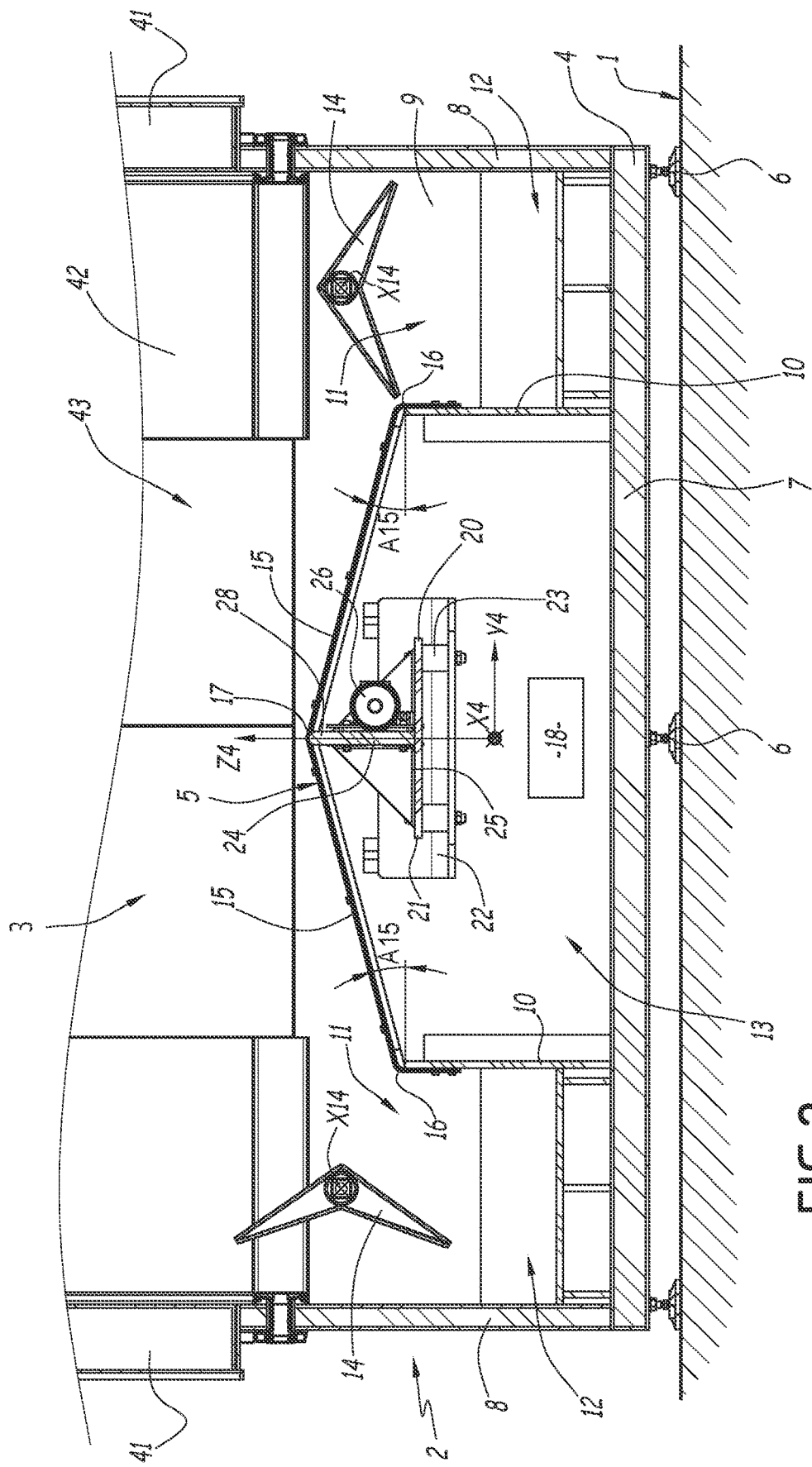
FIG. 2 is a partial section of the powder coating booth of FIG. 1, showing the base in more detail.
Figure 3:
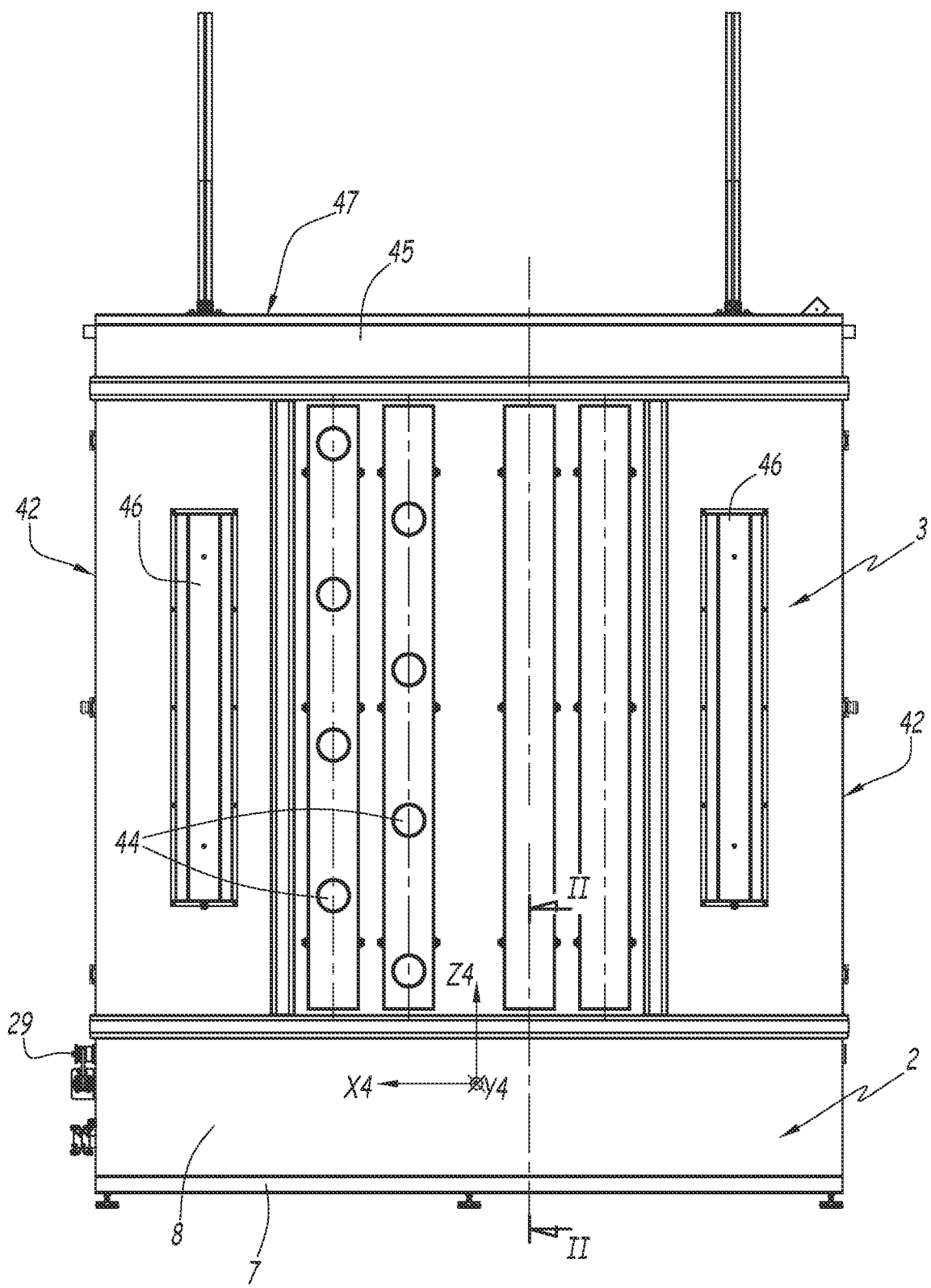
FIG. 3 is a side view of the powder coating booth of the previous figures, showing a section II-II of FIG. 2.

FIGS. 1-3 show a powder coating booth, which rests on a floor 1 that is flat and horizontal. The powder coating booth consists of a base 2 and a powder coating compartment 3.

The powder coating booth is intended to house an operation of applying a coating, such as paint, to an article by electrostatically powder coating the article inside powder coating compartment 3.

Base 2 includes a base structure 4, visible in FIGS. 1-3, and a floor 5, visible in FIG. 2.

A longitudinal direction X4 and a transverse direction Y4 are defined as horizontal and perpendicular when the booth rests on the floor, and a height direction Z4, perpendicular to the X4 and Y4 directions and directed upwards when the booth rests on the floor. The X4, Y4 and Z4 directions are fixed in relation to base structure 4.

Powder coating compartment 3 is delimited at the bottom by floor 5, which forms a raised floor for compartment 3. Compartment 3 consists of two longitudinal main walls 41 opposite and parallel to the X4 and Z4 directions. Compartment 3 consists of two transverse main walls 42 opposite and parallel to the Y4 and Z4 directions. Walls 41 and 42 form an enclosed enclosure that rises from the perimeter of floor 5 to delineate compartment 3.

Powder coating compartment 3 includes at least one opening 43 for the introduction and/or removal of the article to be coated to the inside of compartment 3. Each opening 43 is preferably made through one of walls 42. Opening 43 may be closed, for example, by means of two doors of compartment 3, held by related wall 42. In FIG. 1, opening 43 is shown closed by the doors, which are hinged doors.

Powder coating compartment 3 has at least one opening 44, preferably several openings, for example eight openings 44. Each opening 44 is intended to be passed through by a powder projector, for example an electrostatic spray gun, so that the powder projector may project powder into compartment 3 for coating the article that has been introduced into it. As may be seen in FIG. 3, openings 44 are made through walls 41.

Compartment 3 advantageously includes a roof 45, delimiting the top of the compartment by closing walls 41 and 42 from above. Roof 45 is preferably slit along its entire length by a longitudinal notch 47, for the passage of a conveyor on which the article is suspended, and is responsible for moving the article into compartment 3 through opening 43, positioning the article within compartment 3 so that the article is powder coated, and extracting the article from compartment 3 through the same opening 43 or through another similar opening on opposite wall 42.

Preferably, compartment 3 is made entirely or mainly of polymeric plastic, or at least of a dielectric material.

The powder projected by the projectors is attracted to the article by electrostatic effect, the powder and the article being brought to specific electrostatic potentials. This powder coating causes a residual powder deposit at the bottom of powder coating compartment 3.

Base 2 has an advantageous operational and cleaning configuration. The operational configuration is implemented at least while the article is being powdered in compartment 3, while the cleaning configuration is implemented when no article is being powdered. The cleaning configuration is, for example, implemented for a powder change, for example for a color change. During the powder coating process, openings 43 are preferably opened to enable air to be drawn into compartment 3 by a powder suction system connected to base 2. In the cleaning configuration, openings 43 are preferably closed.

The booth rests on floor 1 via base structure 4, so that base structure 4 is a fixed part of base 2, more generally, of the booth. Base structure 4 supports the rest of the booth from below. For this purpose, base structure 4 includes, for example, feet 6 resting on floor 1 and a back wall 7 parallel to the X4 and Y4 axes, supported by feet 6.

Optionally, compartment 3 has lamps 46, supported by walls 41, to illuminate the interior of compartment 3.

Base structure 4 also includes four contour walls, rising from the perimeter of back wall 7 and forming an enclosure defining a closed contour of base structure 4. The contour walls include two opposing longitudinal contour walls 8 and two opposing transverse contour walls 9. Longitudinal contour walls 8 are parallel to the X4 and Z4 directions. Transverse walls 9 are parallel to the Y4 and Z4 directions.

Preferably, walls 41 rise from walls 8, and walls 42 rise from walls 9.

Base structure 4 also includes two longitudinal inner walls 10. Inner walls 10 are parallel to longitudinal contour walls 8, and are distributed between longitudinal contour walls 8; that is, each wall 10 runs parallel to the X4 and Z4 directions. Bulkhead walls 10 rise up from bottom wall 7 and connect transverse walls 9. In the Z4 direction, bulkhead walls 10 are preferably lower than contour walls 8 and 9 so that they do not protrude beyond them.

Base structure 4 defines two longitudinal gutters 11. Each gutter 11 has a U-shaped cross-section. Each gutter 11 is open upwards, that is, in the Z4 direction, preferably along its entire length. Gutters 11 are distributed at equal distances from each other in the Y4 direction so that they are arranged laterally within base 2. In particular, each gutter 11 is delimited by one of longitudinal contour walls 8, by bulkhead 10 which is closest to this wall 8, and by bottom wall 7.

Parallel to the X4 direction, each gutter 11 has two longitudinal ends, for example, at respective walls 9. One of the longitudinal ends of each gutter 11 constitutes a drainage end 12 of the gutter 11, here the longitudinal end opposite to the X4 direction, as shown in FIG. 2. Each drainage end 12 provides a through-opening through transverse contour wall 9. More generally, it is expected that each gutter 11 will open outside base 2, parallel to the X4 direction, through its respective outlet end 12. Preferably, the powder suction system, arranged outside base 2 and outside the booth, is connected to discharge ends 12, to suck up residual powder present in gutters 11, by vacuuming the volume delimited by gutters 11. This vacuum tends to attract the residual powder present in compartment 3 to gutters 11. The residual powder sucked in is then preferably recycled.

Between gutters 11, base structure 4 defines a container-shaped housing 13. Housing 13 is placed between gutters 11 in the Y4 direction. In particular, housing 13 is delimited, according to the Y4 direction, by bulkheads 10, according to the X4 direction, by walls 9, and, opposite to the Z4 direction, by bottom wall 7. Housing 13 is open in the Z4 direction.

Preferably, base structure 4 is entirely or mainly made of polymer plastic, or at least of a dielectric material, with the possible exception of feet 6.

As may be seen in FIG. 2, floor 5 is supported by base structure 4. Floor 5 is in several parts, all of which are supported by base structure 4. Floor 5 delimits the top of base 2, in the Z4 direction, and the bottom of powder coating compartment 3. Floor 5 is opposite wall 7 in the Z4 direction and extends in the Y4 direction from one of longitudinal contour walls 8 to the other, and in the X4 direction from one of transverse contour walls 9 to the other. As explained below, when the booth is used to powder coat the article, floor 5 receives the residual powder caused by this powder coating, with the residual powder settling on top of floor 5.

As shown in FIG. 2, floor 5 preferably includes a central part, consisting of two oblique panels 15 and two longitudinal retractable flaps 14 arranged laterally to the central part. Panels 15 and flaps 14 delimit the bottom of compartment 3. Gutters 11 extend under floor 5, in particular respectively under flaps 14. Gutters 11 being open in the Z4 direction, gutters 11 are open towards floor 5, towards flaps 14 respectively.

Each oblique panel 15 is advantageously generally flat and preferably rectangular in shape. Each oblique panel 15 extends from one of transverse contour walls 9 to the other. Each oblique panel 15 is inclined with respect to the horizontal when the booth rests on floor 1 via base structure 4. More precisely, each oblique panel 15 is inclined with respect to a plane directed in the X4 and Y4 directions. Preferably, each oblique panel 15 is inclined parallel to the X4 direction by being rotated around the X4 direction, as shown in FIG. 2. Preferably, each oblique panel 15 is inclined at an angle A15 of between 5 and 45 degrees, so as not to obstruct the bottom of powder coating compartment 3 while enabling good flow of the residual powder present on top of each oblique panel 15. Angle A15 is defined between the horizontal plane, that is, directed in the X4 and Y4 directions, and the plane of the related panel 15, preferably around an axis directed in the X4 direction. Angle A15 is preferably between 10 and 20 degrees for an optimal flow of the residual powder.

By being inclined, each oblique panel 15 defines a lower edge 16, which is parallel to the X4 direction, and which advantageously connects walls 9 together, as well as an upper edge 17, which is parallel to edge 16 and which advantageously connects walls 9 together. For each oblique panel 15, edge 17 is higher than edge 16, considering the Z4 direction, because of the inclination of panel 15. According to the Z4 direction, the two edges 16 do not protrude beyond walls 8 and 9. Edges 16 of both panels are advantageously located at the same level in the Z4 direction, as shown in FIG. 2.

For each oblique panel 15, lower edge 16 is permanently attached, preferably along its entire length, to an upper edge of one of walls 10.

Oblique panels 15 are advantageously turned away from each other, while being advantageously joined all along their respective upper edge 17. Thus, oblique panels 15 are arranged in the shape of a two-sloped roof. FIG. 2 shows that oblique panels 15 are arranged in such a way as to define a chevron-shaped cross-section with the tip pointing upwards, that is, in an inverted "V" shape. Upper edge 17 of panels 15 is preferentially the highest point of floor 5 in the Z4 direction. At their respective upper edge 17, the oblique panels 15 form a top edge, which is advantageously parallel to the X4 direction. It is preferable that oblique panels 15 are symmetrically arranged in relation to a vertical plane, that is, for example, a plane directed by the X4 and Z4 axes.

Oblique panels 15 completely cover housing 13, closing the opening delimited by bulkheads 10 and walls 9, like a marquee. Closed housing 13 is advantageously a closed enclosure, or at least separated from powder coating compartment 3, in a way that is impermeable to the residual powder and optionally air-permeable.

Due to the inclination of oblique panels 15, the residual powder that may be deposited on top of oblique panels 15 tends to slide or run off panels 15 from upper edge 17 to lower edge 16 and fall into gutters 11.

Preferably, each oblique panel 15 is porous, so that it is permeable to air, so that air can pass through it, while being impermeable to the residual powder, that is, the powder used for electrostatic powder coating of the article within compartment 3. For example, each oblique panel 15 has pores that are narrow enough to enable air to pass through oblique panel 15, while at the same time substantially preventing the passage of powder, even though the powder has a minimum particle size of between 5 and 100 micrometers.

Since each oblique panel 15 is thus porous, it is advantageous to provide that base 2 has an opening 18 opening under oblique panels 15, that is, opening inside housing 13. For example, opening 18 is made through one of walls 9. Opening 18 is configured to be connected to a compressed air source, in order to introduce pressurized air into housing 13 for cleaning oblique panels 15. In this sense, opening 18 is a means of introducing pressurized air underneath oblique panels 15. Preferably, introduction of pressurized air inside housing 13 is carried out either continuously or in timed cycles depending on the quantity of powder retained on oblique panels 15. Air emitted towards the interior of compartment 3 from the central part of floor 5 removes any residual powder present on panels 15, the powder being then evacuated towards gutters 11, under the effect of the suction through ends 12.

Preferably, floor 5 includes a taut fabric that forms oblique panels 15. Preferably, the two oblique panels 15 are formed by the same fabric sheet, constituting the fabric, the fabric sheet being shaped according to the two panels 15. Preferably, the fabric is attached to bulkheads 10 via lower edges 16.

Preferably, the fabric is woven of continuous warp and weft yarns. The fabric is preferably an elastic fabric. However, a non-elastic fabric may be chosen.

The use of fabric panels 15 is advantageous to achieve the above-mentioned porosity to enable pressurized air to pass through while being impermeable to the powder. In this case, the fabric is chosen with a mesh opening sufficient to be permeable to the air blown through oblique panels 15, while being impermeable to the powder.

For the particular embodiment independent of the invention, in a variant, the fabric, or any other material forming oblique panels 15, is provided to be airtight, in the case where no air is to be blown through oblique panels 15.

Base 2 advantageously includes a beam 20. Beam 20 extends advantageously under oblique panels 15, especially under upper edge 17 of oblique panels 15 at the height of lower edges 16, in the Z4 direction. Beam 20 is arranged inside housing 13. Beam 20 is preferably parallel to the X4 direction. In this example, beam 20 has an inverted T cross section. Preferably, beam 20 has a main frame 24 parallel to the X4 and Z4 directions, which has a top edge 28 facing upwards. In the case of a T cross section, a lower edge of main frame 24 is attached to an auxiliary frame 25 of beam 20, oriented parallel to the X4 and Y4 axes.

Preferably, beam 20 supports respective upper edges 17 of oblique panels 15, preferably via top edge 28 of main frame 24. In a similar way to a ridge beam, beam 20 therefore supports the top edge of the central part of floor 5. Preferably, in the case where panels 15 are formed by the above-mentioned fabric, beam 20 serves as a tensioner for panels 15 by applying a tension force to the fabric in relation to base structure 4, with the tension force being directed in the Z4 direction, the fabric being retained by lower edges 16.

Beam 20 has two beam ends 21, which are longitudinal ends. Each end of beam 21 connects beam 20 to one of transverse contour walls 9. In particular, each wall 9 supports a respective bracket 22 belonging to base structure 4, bracket 22 being attached to an inner face of wall 9, inside housing 13. Each bracket 22 supports one of ends 21 of beam 20, preferably by means of two anti-vibration pads 23. In particular, anti-vibration pads 23 are interposed between frame 25 and a protruding part of bracket 22, extending parallel to the X4 and Y4 directions. In this example, beam 20 is therefore supported by four anti-vibration pads on base structure 4, so that the vibration of beam 20 is achieved without vibration of base structure 4, or with a reduced amount of vibration.

Preferably, beam 20 is height-adjustable, that is, the position of beam 20 in relation to base structure 4 in the Z4 direction may be adjusted. If panels 15 are made of fabric, the fabric tension may be advantageously adjusted via upper edge 28 of beam 20. For this, for example, each end 21 of beam 20 is connected to its respective bracket 22 by one or more threaded rods, which may be screwed together in such a way that the distance between end 21 concerned and bracket 22 may be adjusted in the Z4 direction.

Base 2 includes a vibrator 26, which is configured to vibrate oblique panels 15 with respect to base structure 4. This vibrating action promotes the sliding or flow of residual powder received on the top of panels 15 from upper edge 17 to lower edge 16, and particularly to gutters 11. It is preferred that panels 15 be made of fabric, which facilitates transmission of vibration to panels 15 without vibrating the rest of the booth.

Vibrator 26 is advantageously supported by beam 20, by being fixed on beam 20, for example, halfway between transverse contour walls 9, as shown in FIG. 2. Preferably, vibrator 26 is a pneumatic or electric vibrator.

Each flap 14 is preferably arranged at approximately the same height as panels 15, according to the Z4 direction. Each flap 14 extends advantageously from one of contour cross-walls 9 to the other, attached to it by longitudinal ends of flap 14. Each flap 14 advantageously includes two oblique panels so that they have a chevron-shaped cross profile.

Each retractable flap 14 may be moved relative to base structure 4, for example by being rotated around a respective axis of rotation X14, which is an axis of flap 14 itself, parallel to the X4 direction. Each flap 14 is movable between an extended position shown for flap 14 on the right of FIG. 2, and an open position shown for flap 14 on the left of FIG. 2, for example by making a quarter turn. Preferably, the extended position is implemented in the operational configuration of base 2, during the powder coating of the article. In the extended position, retractable flap 14 covers one of gutters 11 like a roof, being essentially parallel to the X4 and Y4 directions. In this case, the chevron-shaped profile of flap 14 is oriented with the point upwards, according to the Z4 direction. As seen in panels 15, the roof shape of flap 14 promotes the flow of residual powder to the lower longitudinal edges of the flap, to gutter 11 below. In the extended position, in the Y4 direction, flap 14 extends from edge 16 of panel 15, to which flap 14 is adjacent, to wall 8 beyond gutter 11, which flap 14 overhangs. Preferably, a first lower longitudinal edge of flap 14 is adjacent to edge 16, at a clearance distance in order to form, with edge 16, a longitudinal notch parallel to the X4 direction when the flap is in the deployed position. Preferably, a second lower longitudinal edge of flap 14 is adjacent to wall 8 at a clearance distance so as to form, with wall 8, another longitudinal notch parallel to the X4 direction when the flap is in the extended position. Thus, in the deployed position, flap 14 covers gutter 11 while enabling residual powder to enter gutter 11, preferably through one or two notches formed at the longitudinal edges of flap 14.

Preferably, in the deployed position, flaps 14 and panels 15 occupy almost an entire surface, parallel to the X4 and Y4 directions and delimited by contour walls 8 and 9, except for the notches for the admission of powder into gutter 11 formed at the periphery of flaps 14.

In the open position, each flap 14 uncovers the longitudinal gutter 11 that it overhangs, so that flap 14 covers less of gutter 11 when in the open position compared to the extended position. The open position is preferentially adopted in the cleaning configuration. Openings 43 are then advantageously closed and no items are preferentially present in compartment 3. When flap 14 is thus moved to the open position, any residual powder that may have remained on flap 14, or that may have collected in the notches formed at the periphery of flap 14 when flap 14 is in the extended position, falls into gutter 11 just below.

Preferably, each flap 14 is entirely or essentially made of polymer plastic, or at least of a dielectric material.

Preferably, as seen in FIG. 1, the base has actuators 29, which operate flaps 14 to toggle them between the extended and open positions. Preferably, each actuator 29 is carried by one of walls 9, which is opposite to the wall 9 carrying the discharge ends 12. For example, each actuator 29 includes a pneumatic cylinder, which actuates a connecting rod attached to one of flaps 14, to rotate the flap 14. Preferably, actuators 29 are arranged outside of base structure 4, especially beyond wall 9 in relation to flaps 14, so that they are protected from residual powder inside the booth.

For the particular embodiment independent of the invention, in a variant, each panel 15 is made of a plate or a sheet of polymer plastic material, or at least of dielectric material.

In a variant, either end 21 of beam 20 may be supported by base structure 4 by means of a single anti-vibration pad 23, or by a respective number of anti-vibration pads different from two.

In a variant, for specific applications, base 2 is provided with a single oblique panel 15 and a single gutter 11 to receive the residual powder dripping from oblique panel 15. In this case, it is preferable to have a single flap 14 in line with gutter 11. In this case, upper edge 17 of the oblique panel is attached to one of walls 8, for example. In this case, base 2 advantageously includes a single bulkhead 10 to which edge 16 is attached. Housing 13 is delimited by bulkhead 10 and by the wall 8. In this case, the base may have a single actuator 29 that operates flap 14.

In a variant, for other applications, base 2 may have a respective number of oblique panels 15, gutters 11, flaps 14, etc., more than two.

Any of the features described above for any of the above-described embodiments and variants may be implemented in the others embodiments and variants described above.

The invention claimed is:

1. A base for a powder coating booth, the powder coating booth comprising a coating compartment for applying a powder coating to an article inside the coating compartment, and the base comprising:
   a base structure configured to support the coating compartment;
   a floor, supported by said base structure and comprising at least one oblique panel, each oblique panel (i) comprising an upper edge and a lower edge opposite said upper edge, (ii) being inclined with respect to a horizontal plane when the base rests on a ground surface via said base structure, (iii) delimiting a bottom of the coating compartment, and (iv) being porous so as to be air permeable and impermeable to a residual powder from a powder coating of the article within the coating compartment, wherein each oblique panel is attached to the base structure by its lower edge and wherein the base is configured such that pressurized air from a compressed air source is introduced under the at least one oblique panel, and such that the pressurized air thus introduced passes through the at least one oblique panel towards an interior of the coating compartment, to detach the residual powder from the powder coating, as the residual power is present on the at least one oblique panel;

a beam, extending under said at least one oblique panel and supporting each oblique panel by the upper edge of the oblique panel;

at least one anti-vibration pad, attaching the beam to the base structure; and a vibrator, separate from the pressurized air and from the compressed air source, and supported by the beam, vibrating each oblique panel relative to said base structure, for flowing of the residual powder from the powder coating, as the residual powder is present on the at least one oblique panel, from its upper edge to its lower edge.

2. The base according to claim 1, wherein said at least one oblique panel has an inclination of an angle between 5 degrees and 45 degrees with respect to the horizontal plane, when the base rests on the ground surface via said base structure.

3. The base according to claim 1, wherein said at least one oblique panel has an inclination of an angle between 10 degrees and 20 degrees with respect to the horizontal plane, when the base rests on the ground surface via said base structure.

4. The base according to claim 1, said at least one oblique panel comprises two oblique panels, each of which is flat, wherein the two oblique panels are joined to their respective upper edges all along their respective upper edges.

5. The base according to claim 1, wherein said base structure comprises two opposing transverse contour walls, said at least one oblique panel connecting the two transverse contour walls to each other, and wherein the beam comprises two opposite beam ends, wherein each beam end is attached to one of said two transverse contour walls via said at least one anti-vibration pad.

6. The base according to claim 1, wherein the lower edge of each oblique panel is permanently attached to the base structure by being attached to a longitudinal bulkhead belonging to said base structure, and wherein said base structure comprises at least one longitudinal gutter, which is bounded by the longitudinal bulkhead, extends under said floor, is open towards said floor, and has a discharge end through which the at least one longitudinal gutter opens out of the base, and wherein said floor includes at least one retractable flap which is movable between:

a deployed position, in which the at least one retractable flap covers said at least one longitudinal gutter, and an open position, in which the at least one retractable flap uncovers said at least one longitudinal gutter compared to the extended position.

7. The base according to claim 6, wherein said at least one retractable flap is movable between the extended position and the open position by being rotatable relative to said base structure.

8. The base according to claim 1, further comprising a compressed air inlet opening connected to the compressed air source to introduce the pressurized air under said at least one oblique panel through the compressed air inlet opening.

9. The base according to claim 1, wherein said floor comprises a taut fabric which forms said at least one oblique panel.

10. A powder coating booth comprising:
the base according to claim 1; and
the powder coating compartment, which is supported by the base structure of said base, and whose bottom is delimited by the floor of said base.

11. The powder coating booth of claim 10 further comprising the compressed air source.

12. The base according to claim 9, wherein the beam tensions the taut fabric relative to the base structure.

* * * * *